United States Patent
Liu et al.

(10) Patent No.: US 12,020,048 B2
(45) Date of Patent: Jun. 25, 2024

(54) CREATING SCRIPTS FROM COMMAND LINE HISTORY

(71) Applicant: INTERNATIONAL BUSINESS MACHINES CORPORATION, Armonk, NY (US)

(72) Inventors: Jiang Yi Liu, Beijing (CN); Min Cheng, Beijing (CN); Xiao Xuan Fu, Wuhan (CN); Si Yu Chen, Beijing (CN); Wen Qi Wq Ye, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 17/655,559

(22) Filed: Mar. 21, 2022

(65) Prior Publication Data
US 2023/0297400 A1   Sep. 21, 2023

(51) Int. Cl.
*G06F 9/455* (2018.01)
(52) U.S. Cl.
CPC ................ *G06F 9/45512* (2013.01)
(58) Field of Classification Search
CPC .................................................. G06F 9/45512
See application file for complete search history.

(56) References Cited

U.S. PATENT DOCUMENTS

| | | | |
|---|---|---|---|
| 8,411,496 B2 | 4/2013 | Hong | |
| 8,627,230 B2 | 1/2014 | Boehler | |
| 9,626,159 B2 | 4/2017 | Mahmud | |
| 10,394,925 B2 | 8/2019 | Bengualid | |
| 2006/0053126 A1 | 3/2006 | Baca | |
| 2013/0055268 A1 | 2/2013 | Amershi | |
| 2016/0306875 A1* | 10/2016 | Acuña | G06F 40/274 |
| 2019/0156232 A1* | 5/2019 | Ramraz | G06N 20/20 |

FOREIGN PATENT DOCUMENTS

CN   111586457 A   8/2020

OTHER PUBLICATIONS

Agostinelli et al., "Automated Generation of Executable RPA Scripts from User Interface Logs" https://link.springer.com/chapter/10.1007/978-3-030-58779-6_8, Spinger Nature Switzerland AG, BPM Blockchain and RPA Forum LNBIP 393, 2020, p. 116-131.
Disclosed Anonymously, "A Shell Script Auto Generation System and Method", https://priorart.ip.com/IPCOM/000264131, IPCOM000264131D, Nov. 14, 2020, pp. 1-9.
Mell et al., "The NIST Definition of Cloud Computing", National Institute of Standards and Technology, Special Publication 800-145, Sep. 2011, pp. 1-7.

* cited by examiner

*Primary Examiner* — Duy Khuong T Nguyen
(74) *Attorney, Agent, or Firm* — Edward J. Wixted, III

(57) ABSTRACT

Provided herein are a method, system, and computer program product for creating scripts from command line history. The method includes determining a plurality of distances among a plurality of commands from a command line history. A plurality of command sets is determined from the plurality of commands based on the plurality of distances among the plurality of commands. Each of the plurality of command sets includes at least two neighboring commands. A script is created by the one or more processors based on a first command set and a second command set of the plurality of command sets in response to a distance between the first command set and the second command set being less than a predetermined threshold.

18 Claims, 14 Drawing Sheets

```
> ls –al comp6
comp6 comp6.dll
```

*FIG. 4A*

| Name | option | object | Return code | output |
|---|---|---|---|---|
| ls | -al | comp6* | 0 | comp6 comp6.dll |

*FIG. 4B*

($V_1$) cd /u/myid/project/version8/src/component6
($V_2$) make clean
($V_3$) make
($V_4$) ls –al comp6
($V_5$) ./comp6 ~/test/defect123456/testcase
($V_6$) scp comp6 myid2@mysystem2:/u/mytest/test1/comp6-new
($V_7$) vi sourcefile9.c
($V_8$) make clean
($V_9$) make
($V_{10}$) ls –al comp6
($V_{11}$) ./comp6 ~/test/defect123456/testcase
($V_{12}$) scp comp6 myid2@badsystem2:/u/mytest/test1/comp6-new
($V_{13}$) scp comp6 myid2@mysystem2:/u/mytest/test1/comp6-new

*FIG. 6*

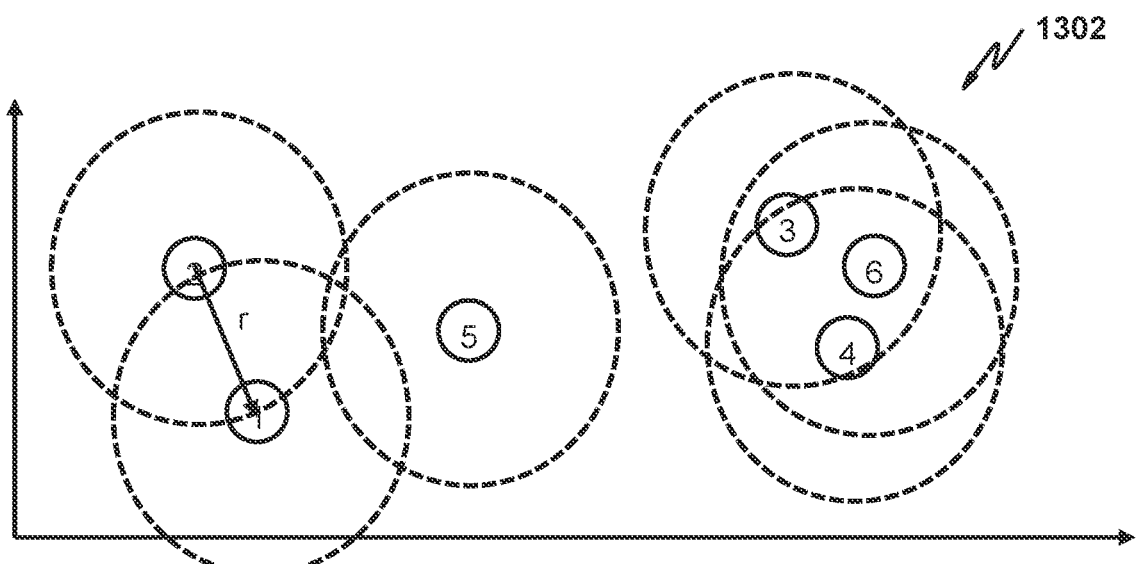
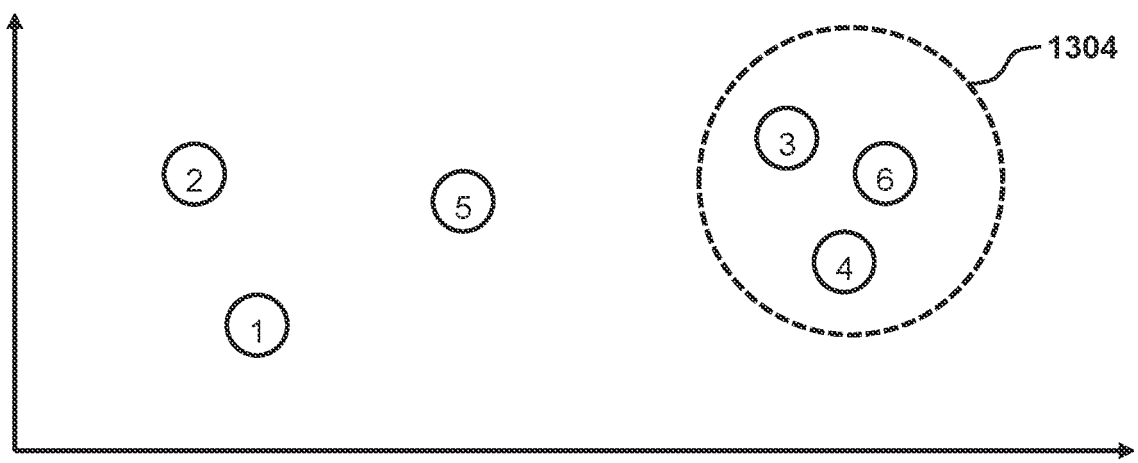
FIG. 13

CREATING SCRIPTS FROM COMMAND LINE HISTORY

BACKGROUND

The present disclosure relates to computing devices and systems, and more specifically, to creating scripts from a command line history.

A command line interface (CLI) provides a method of interacting with a device or software by allowing a user to enter commands into a text terminal, a terminal emulator, or remote shell client. The commands are processed by a command line interpreter which initiates operations that correspond to the entered command. A relatively simple CLI usually displays a prompt to accept a command that is typed by a user and terminated by an enter key. A typical command includes a command name, which designates the type of operation to be performed and a parameter, which may be data, a file, a device or an object on which the operation should be performed. One or more switches flags, or other entries may also be included to modify or control how the operation is executed.

SUMMARY

According to one embodiment of the present disclosure, there is provided a computer-implemented method. The method includes determining a plurality of distances among a plurality of commands from a command line history. A plurality of command sets is determined from the plurality of commands based on the plurality of distances among the plurality of commands. Each of the plurality of command sets includes at least two neighboring commands. A script is created by the one or more processors based on a first command set and a second command set of the plurality of command sets in response to a distance between the first command set and the second command set being less than a predetermined threshold.

According to another embodiment of the present disclosure, there is provided a computer system. The computer system includes one or more computer processors, one or more computer-readable storage media, and program instructions stored on the one or more of the computer-readable storage media for execution by at least one of the one or more processors. The program instructions include a method. The method includes determining a plurality of distances among a plurality of commands from a command line history. A plurality of command sets is determined from the plurality of commands based on the plurality of distances among the plurality of commands. Each of the plurality of command sets includes at least two neighboring commands. A script is created by the one or more processors based on a first command set and a second command set of the plurality of command sets in response to a distance between the first command set and the second command set being less than a predetermined threshold.

According to another embodiment of the present disclosure, there is provided a computer program product including one or more computer-readable storage media and program instructions stored on the one or more computer-readable storage media. The program instructions include a method. The method includes determining a plurality of distances among a plurality of commands from a command line history. A plurality of command sets is determined from the plurality of commands based on the plurality of distances among the plurality of commands. Each of the plurality of command sets includes at least two neighboring commands. A script is created based on a first command set and a second command set of the plurality of command sets in response to a distance between the first command set and the second command set being less than a predetermined threshold.

BRIEF DESCRIPTION OF THE SEVERAL VIEWS OF THE DRAWINGS

The following detailed description, given by way of example and not intended to limit the exemplary embodiments solely thereto, will best be appreciated in conjunction with the accompanying drawings, in which:

FIG. 4A depicts an example command line history in accordance with some embodiments of the present disclosure.

FIG. 4B depicts an example feature vector corresponding to the command line history in FIG. 4A in accordance with some embodiments of the present disclosure.

FIG. 6 depicts an example command line history in accordance with some embodiments of the present disclosure.

FIG. 13 depicts a method for clustering command sets in accordance with some embodiments of the present disclosure.

DETAILED DESCRIPTION OF THE DRAWINGS

Figure 1:
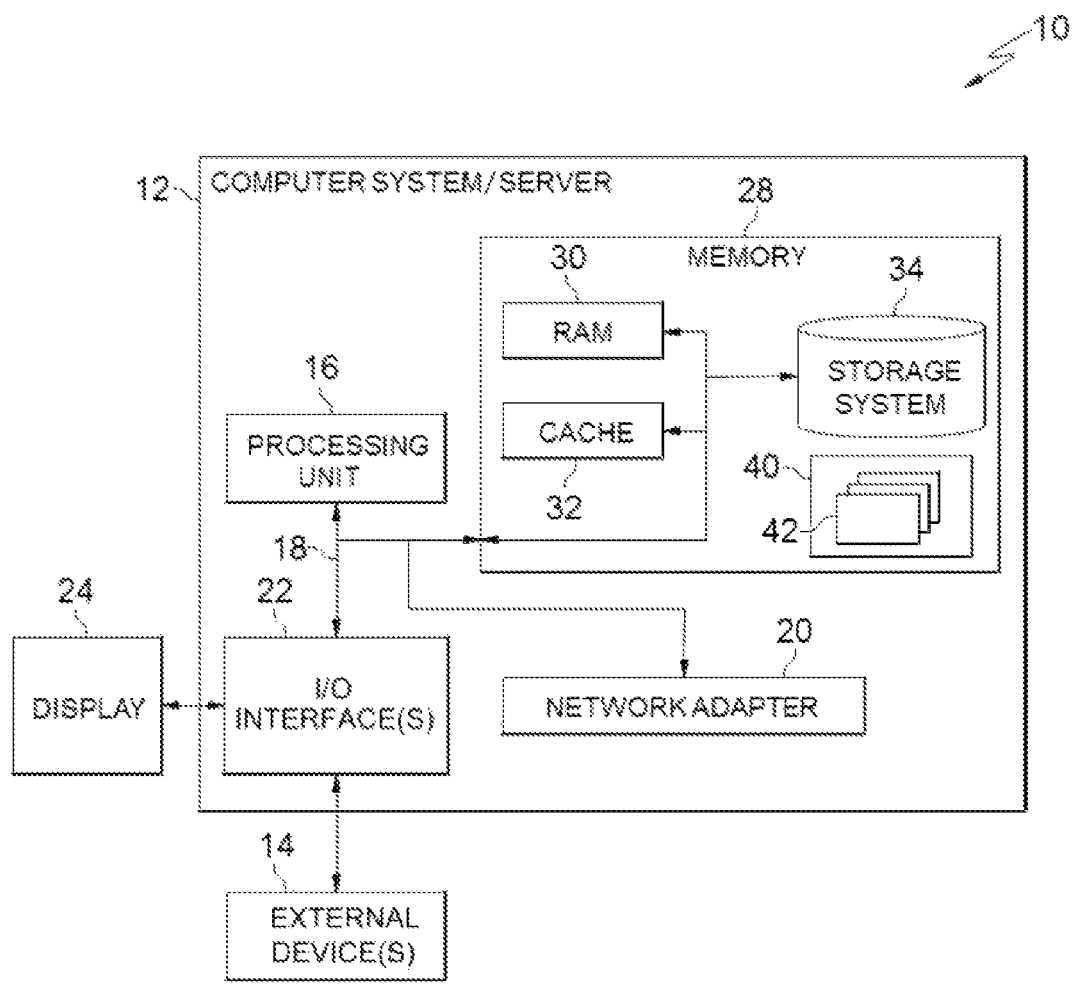
FIG. 1 depicts a cloud computing node according to an embodiment of the present disclosure.

Exemplary embodiments of the present inventive concept are disclosed hereafter. However, it shall be understood that the scope of the present inventive concept is dictated by the claims. The disclosed exemplary embodiments are merely illustrative of the claimed system, method, and computer program product. The present inventive concept may be embodied in many different forms and should not be construed as limited to only the exemplary embodiments set forth herein. Rather, these included exemplary embodiments are provided for completeness of disclosure and to facilitate an understanding to those skilled in the art. In the detailed description, discussion of well-known features and techniques may be omitted to avoid unnecessarily obscuring the presented exemplary embodiments.

References in the specification to "one embodiment," "an embodiment," "an exemplary embodiment," etc., indicate that the embodiment described may include a particular feature, structure, or characteristic, but not every embodiment may necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 may carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
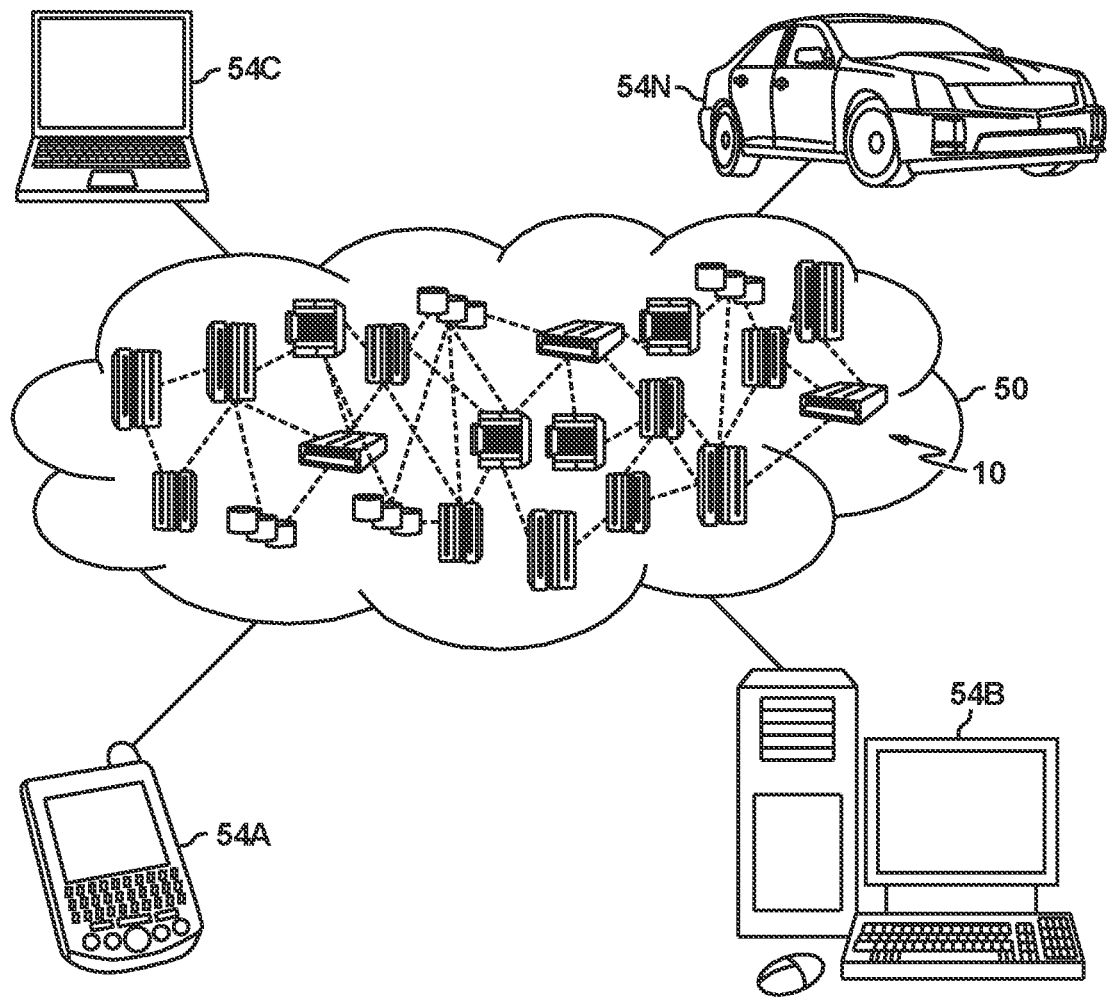
FIG. 2 depicts a cloud computing environment according to an embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. The cloud computing nodes 10 may communicate with one another. They may be grouped physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that the cloud computing nodes 10 and the cloud computing environment 50 can communicate with any type of computerized device over any type of network and/or network addressable connection (e.g., using a web browser).

Figure 3:
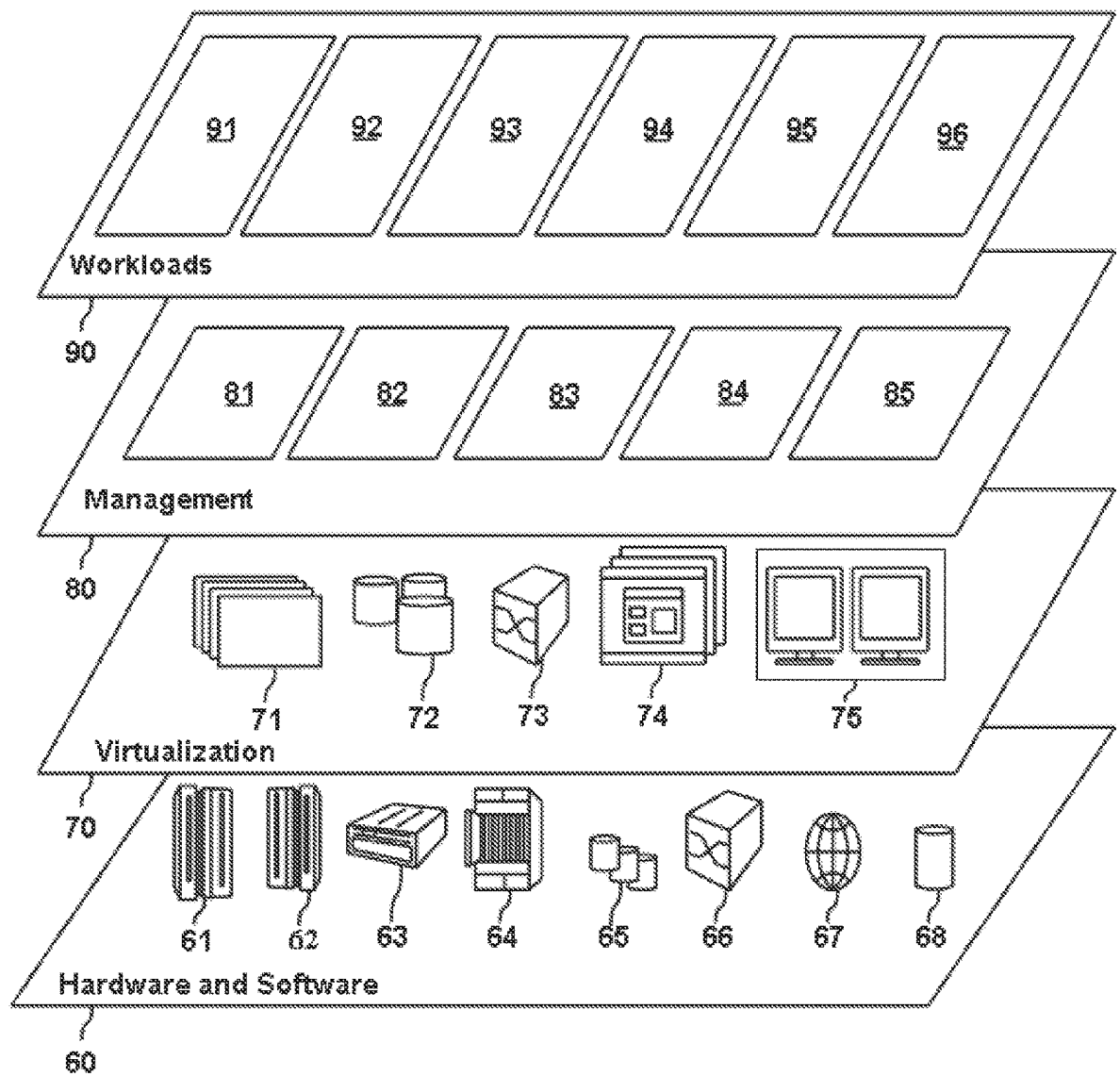
FIG. 3 depicts abstraction model layers according to an embodiment of the present disclosure.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

A hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

A virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

A workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and script creating 96.

In accordance with some embodiments of the present disclosure, a command line history may be analyzed to identify similar command sets from the command line history. Similar command sets may represent a common pattern that the user is likely to use in the future. The command sets may be used to derive a script for the user. By using the derived script, the user may save a lot of effort without having to input a large number of commands instead. Exemplary embodiments of the present disclosure will now be described with reference to the drawings.

With reference now to FIG. 4A, a command line history 400 in accordance with some embodiments of the present disclosure is depicted. The command line history 400 may include a command "ls -al comp6" and an output of the command "comp6 comp6.dll". In this example, the name of the command is "ls", the option of the command is "-al", and the object of the command is "comp6". When the command is executed, the output "comp6 comp6.dll" may be produced and displayed on the terminal. In addition, the execution of the command may result in a return code "0", which may indicate that the execution of the command is successful. In this example, the result of executing the command may include both the output "comp6 comp6.dll" and the return code "0". It is to be understood that the result of executing a command may include at least one of an output and a return code in another example. For example, if the result of executing a command does not include an output to be displayed on the terminal, the output of the command may be set to "null".

Each command from the common line history may be converted into a feature vector including a plurality of elements, where each element may include a feature of the command. It is to be understood that the term "command" here might not only include the body of the command, but also the result of the command. For the sake of clarity, a body of a command may also be referred to as a command in the present disclosure. FIG. 4B is a table 450 showing a feature vector converted from or representing the command as shown in FIG. 4A. As shown in FIG. 4B, the feature vector may include a command body vector and a result vector, where the command body vector may include a name element corresponding to the name feature of the command, an option element corresponding to the option feature of the command, and an object element corresponding to the object feature of the command. The result vector may include a return code element corresponding to the return code feature of the command, and an output element corresponding to the output feature of the command. A feature vector is a representation of the corresponding command and thus may be interchangeable with the command in the present disclosure. In addition, a feature vector may be shorted as a vector and thus may be interchangeable with a vector in the present disclosure.

In connection with the command line history 400 as shown in FIG. 4A, the name element may be "ls", the option element may be "-al", the object element may be "comp6*", the return code element may be "0", and the output field may be "comp6 comp6.dll". It is to be understood that although FIG. 4B shows several specific elements of the feature vector, one or more elements may be removed from the feature vector and/or one or more elements may be added into the feature vector, for example.

In some embodiments, one or more elements of the feature vector may be weighted. For example, at least a part of the elements of the command body vector may be weighted. In this case, the name element, the option element, and/or the object element may be weighted. For example, weights w1, w2, and w3 may be assigned to the name element, the option element, and the object element, respectively. In this case, the feature vector V of the command line history 400 in FIG. 4A may be represented as V={w1*"ls", w2*"-al", w3*"comp6\*", 0, "comp6 comp6.dll"}.

In some embodiments, the elements of the feature vectors should be comparable, in order to determine the distance between the feature vectors. However, in some cases, the elements in different feature vectors may have different formats and cannot be compared with each other. For example, the object elements in different feature vectors may have different formats and cannot be compared with each other. In this case, an element in a short format may be converted to its full format. As an example, an alias of a command may be replaced by its corresponding command in a full format. As another example, a file path may be expanded to a full path. As a result, each of the elements of a feature vector has a uniform format and each element is comparable across different feature vectors.

For example, the formats of the commands may be saved in a configure file or a configuration file. The commands may be converted to conform to the formats as defined in the configuration file. For example, the user may add one or more self-defined formats in the configuration file. As an example, the user may define the following command format in the configuration file.

crontab [-el-1l-r] [-u user] [file]
 Command crontab
 Option: [-el-1l-r] [-u user]
 Object: [file]

In some embodiments, the options of the commands may be sorted in an alphabet order. For example, an option "-xcvf" may be changed to "-cfvx". In this case, the options between different commands are consistent with each other and may be compared with each other.

In some embodiments, the weights of the elements of the command body vector may be constants or may be dynamically optimized by training. For example, the weight of the name element may be set to 1, the weight of the option element may be denoted by w, and the weight of the object element may be denoted by 1-w. In this case, the weight of the name element is normalized and only one constant w may be optimized. For example, the default value 0.5 may be set for the weight w, which may be optimized by training, which will be subsequently discussed.

In some embodiments, the distances among the feature vectors may be determined. For example, the distances between each feature vector and all the other feature vectors may be determined. The distance between a feature vector $V_m$ of a first command and a feature vector $V_n$ of a second command may be represented by $D(V_m, V_n)$. In this case, the distance between the first command and the second command may be represented by the distance between the feature vector $V_m$ and the feature vector $V_n$. In addition, the command body vectors may be used to determine the distance $D(V_m, V_n)$ and the result vectors might not be taken into account when determining the distance $D(V_m, V_n)$.

Figure 5:
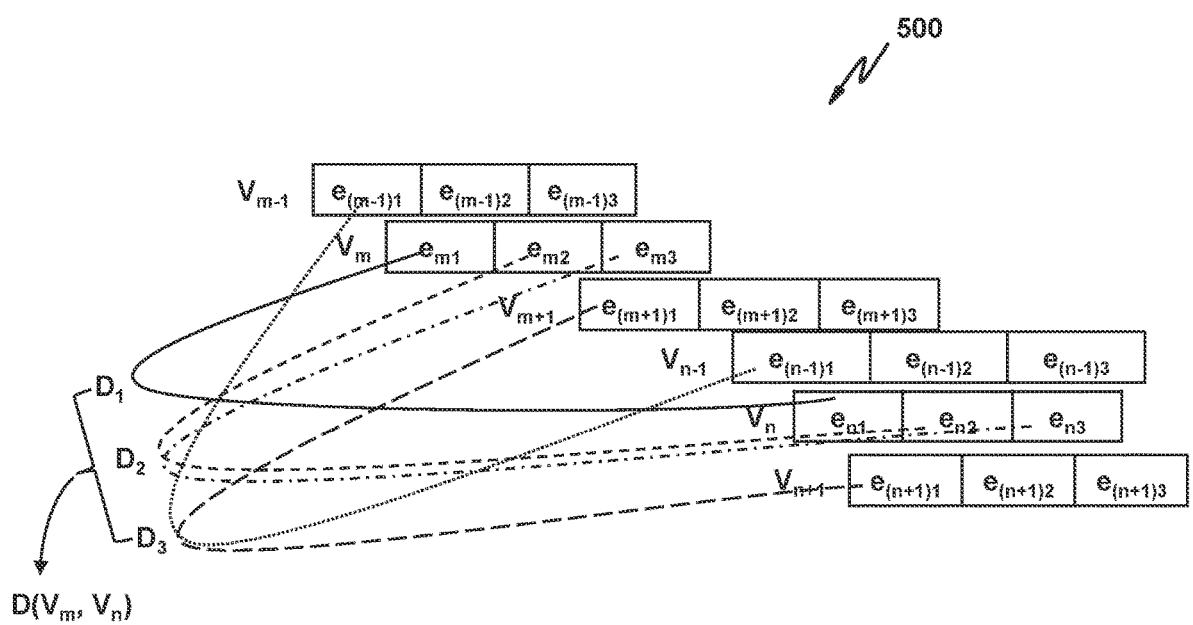
FIG. 5 depicts an example method for determining the distance between two commands in accordance with some embodiments of the present disclosure.

FIG. 5 is a schematic diagram 500 showing an example of computing a distance between feature vectors (e.g., the distance $D(V_m, V_n)$ between the feature vectors $V_m$ and $V_n$). As shown in FIG. 5, the distance $D(V_m, V_n)$ may include a first part $D_1$, a second part $D_2$, and a third part $D_3$. The first part $D_1$ may be represented by $D_1=D(e_{m1}, e_{n1})$, i.e., a distance between the name element $e_{m1}$ of the first command and the name element $e_{n1}$ of the second command. It is noted that the symbol $e_{ab}$ denotes the element b in the feature vector $V_a$. For example, $e_{m1}$ denotes the first element of the feature vector $V_m$, i.e., the name element of the feature vector $V_m$. The second part $D_2$ may be represented by $D_2=w*D(e_{m2}, e_{n2})+(1-w)*D(e_{m3}, e_{n3})$, i.e., a weighted sum of a distance between the option element $e_{m2}$ of the first command and the option element eat of the second command (denoted as $D(e_{m2}, e_{n2})$) and a distance between the object element $e_{m3}$ of the first command and the object element $e_{n3}$ of the second command (denoted as $D(e_{m3}, e_{n3})$). The third part $D_3$ may be represented by $D_3(V_m, V_n)=D_1(V_{m-1}, V_{n-1})+D_1(V_{m+1}, V_{n+1})$, i.e., a sum of a distance between the name element $e_{(m-1)1}$ of the first command and the option element $e_{(n-1)1}$ of the second command (i.e., $D(e_{(m-1)1}, e_{(n-1)1})$, also denoted as $D_1(V_{m-1}, V_{n-1})$) and a distance between the object element $e_{m3}$ of the first command and the object element $e_{n3}$ of the second command (i.e., $D(e_{(m+1)1}, e_{(n+1)1})$, also denoted as $D_1(V_{m+1}, V_{n+1})$).

FIG. 6 depicts a command line history 600 in accordance with some embodiments of the present disclosure. As shown in FIG. 6, the command line history 600 includes thirteen commands respectively denoted by $V_1$ to $V_{13}$. For the sake of clarity, the results of the commands are not shown in FIG. 6. In the command line history 600, the distances $D(V_1, V_2)$, $D(V_1, V_8)$, and $D(V_2, V_8)$ may be calculated as:

$D(V_1, V_2)$:

$D_1=D(\text{cd},\text{make})$, $D_2=w*D(\text{null},\text{clean})+)-1-w)*D(/u/\text{myid/project/version8/src/comp6},\text{null})$ $D_3(V_1,V_2)=D_1(V_0,V_1)+D_1(V_2,V_3)$ $D(V_1, V_8)$:

$D_1=D(\text{cd},\text{make})$, $D_2=w*D(\text{null},\text{clean})+(1-w)*D(/u/\text{myid/project/version8/src/comp6},\text{null})$ $D_3(V_1,V_8)=D_1(V_0,V_7)+D_1(V_2,V_9)$ $D(V_2, V_8)$:

$D_1=D(\text{make},\text{make})$, $D_2=w*D(\text{clean},\text{clean})+(1-w)*D(\text{null},\text{null})$ $D_3(V_2,V_8)=D_1(V_1,V_7)+D_1(V_3,V_9)$ It is to be understood that the distance between two command strings may be computed by any method currently known or to be developed in the future. The distance between two strings may be a normalized distance to facilitate subsequent processing. For example, the Jaccard index, the Srrensen-Dice coefficient, the Levenshtein distance, and/or the cosine similarity may be used to determine the distance between two strings.

In some embodiments, the first part of the distance between the first command and the second command may be defined in such a way that the first part of the distance is zero if the name of the first command is the same as the name of the second command and the first part of the distance is a large constant number (denoted as max_distance) if the name of the first command is different from the name of the second command. In other words, $D_1=0$, if the name of the first command is the same as the second command; $D_1$=max_distance, if the name of the first command is different from the name of the second command.

For example, the name "cd" is not the same as the name "make" and D(cd, make)=max_distance>0. In this case, the command $V_1$ does not match with the command $V_2$, and the command $V_1$ does not match with the command $V_8$. On the other hand, the distance D(make, make)=0, and the feature vector $V_2$ matches with the feature vector $V_8$.

The second part represents the distance between the first command and the second command, if the first command matches with the second command. For example, the feature vector $V_2$ matches with the feature vector $V_8$, and the second part $D_2(V_2, V_8)=w*D(\text{clean}, \text{clean})+(1-w)*D(\text{null}, \text{null})=0$.

For example, the commands "ls -a comp6" and "make clean" do not match. The commands "make clean" and "make clean" match and the distance between the commands is zero. The commands "make clean" and "make" match and the distance between the commands is w*D (clean, null).

As shown in FIG. 6, the command $V_1$ is a neighbor of the command $V_2$ and is entered before the command $V_2$; the command $V_2$ is a neighbor of the command $V_3$ and is entered before the command $V_3$. The command $V_3$ is a neighbor of the command $V_2$ and is entered after the command $V_2$; the command $V_4$ a neighbor of the command $V_3$ and is entered after the command $V_3$. Therefore, the third part of the distance between the commands $V_2$ and $V_3$ is expressed as follows:

$D_3(V_2,V_3)=D_1(V_1,V_2)+D_1(V_2,V_4)$ where the first part of the distances may be computed with the method as described before. As a result, $D_3(V_2, V_3)=2*$max_distance.

In some embodiments, the thresholds Th1, Th2, and Th3 may be defined to compare with the first, second, and third parts of the distance between the first and second commands, respectively. If each part of the distance between the first and second commands is less than the respective predetermined threshold, the first command may be determined to match with the second command. For example, if the first part of the distance between the first and second command is less than the threshold Th1, the second part of the distance between the first and second commands is less than the threshold Th2, and the third part of the distance between the first and second commands is less than the threshold Th3, the first command may be determined to match with the second command.

In some embodiments, the threshold Th1 may be defined to zero. In this case, if the name of the first command is the same as the name of the second command, the first part of the distance between the first command and the second command is equal to zero and the first command may be determined to match with the second command; otherwise, the first part of the distance between the first command and the second command is greater than zero and the first command might not be determined to match with the second command.

In some embodiments, the threshold Th2 may be defined between zero and one, which may allow the object and option of the two commands are similar enough but are not necessarily the same. If the first part of the distance between the first command and the second command is greater than zero, the first command is determined not to match with the second command and it might not be necessary to determine whether the second part of the distance is less than the threshold Th2.

In some embodiments, the threshold Th3 may be defined as: Th3=max_distance+Th1. In this case, if at least one of the neighbors of the first command matches with the corresponding at least one of the neighbors of the second command, the third part of the distance is equal to or less than the threshold Th3; otherwise, the third part of the distance is greater than the threshold Th3.

As an example, the command $V_2$ does not match with the command $V_3$, because $D_3(V_2, V_3)=2*max\_distance>Th3$. As another example, the command $V_2$ matches with the command $V_8$, because $D_1(V_2, V_8)=0<=Th1$, $D_2(V_2, V_8)=0<=Th2$, and $D_3(V_2, V_8)=max\_distance<=Th3$.

In some embodiments, the threshold Th2 and the weight w may be determined by training. For example, the training process may be implemented based on the first training set and/or the second training set. The first training set may include a plurality of command pairs, where each pair of commands match with each other. The second training set may include a plurality of command pairs, where each pair of commands do not match with each other. For example, the first training set may include the following pairs: (ls -al filename, ls -a filename); (./configure -static, ./configure-static64). It is to be understood that each pair of commands in the first training set might not be exactly the same as each other. In this way, the threshold Th2 may range from zero to one, which may allow a tolerance of the match. For example, the second training set may include the following pairs: (make clean, make); and (chtag -p filename, chtag -tc ISOxxxx filename).

The $D_2$ value of each command pair in the first training set may be computed to train the threshold Th2. The average or median of the $D_2$ values may be determined as the threshold Th2. For example, the larger one of the average or median of the $D_2$ values may be determined as the threshold Th2. It is to be understood that any suitable methods may be used to determine the threshold Th2.

When training the weight w, by adjusting the weight w from 0 to 1, the $D_2$ values of the command pairs may be recursively computed to determine the match result of the command pairs. If a weight value makes the command pairs in the first training set to match and the command pairs in the second training set not to match, the weight w may be defined to the weight value. When the training sets are updated, the method may be used to update the weight w and the threshold Th2.

Figure 7:
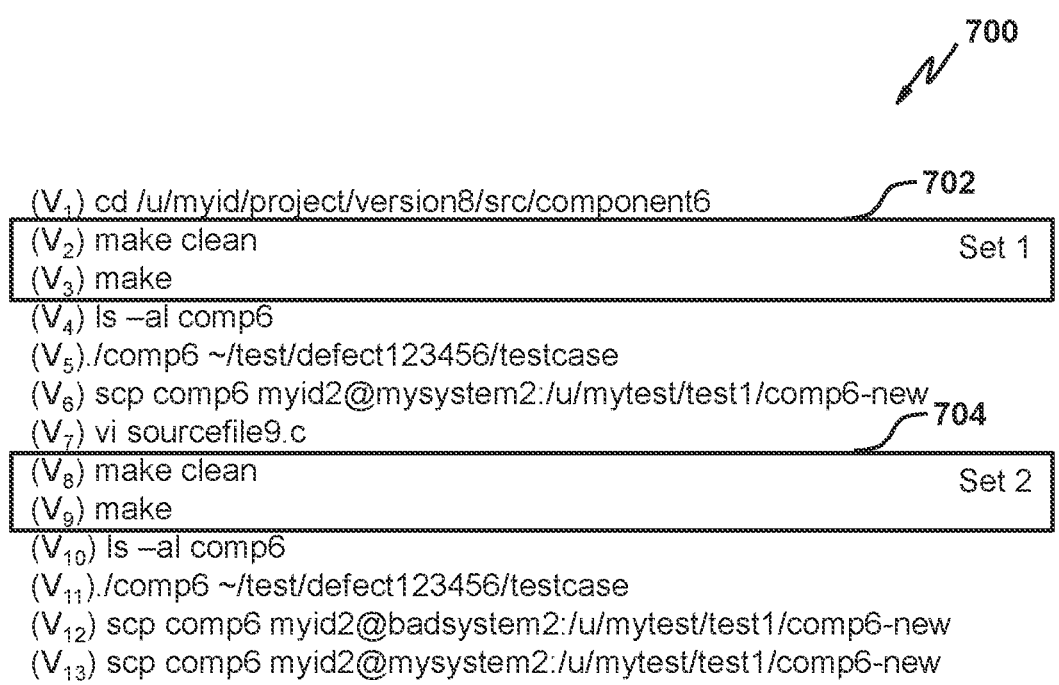
FIG. 7 depicts an example command line history including two command sets in accordance with some embodiments of the present disclosure.

FIG. 7 depicts an example command line history 700 including a first vector set 702 and a second vector set 704. For example, the first vector set 702 and the second vector set 704 may be determined based on the match between the feature vectors $V_2$ and $V_8$. If the first feature vector matches with the second feature vector, the name element of at least one of the neighbors of the first feature vector is the same as the name element at least one of the neighbors of the second feature vector. In this case, it is possible for a neighbor of the first feature vector to match with a corresponding neighbor of the second feature vector. The distance between the neighbor of the first feature vector and the corresponding neighbor of the second feature vector may be determined. In this case, it can be determined whether the neighbor of the first feature vector matches with the corresponding neighbor of the second feature vector. If the neighbor of the first feature vector matches with the corresponding neighbor of the second feature vector, two vector sets may be determined to match with each other.

In FIG. 7, the feature vector $V_2$ matches with the feature vector $V_8$, and the feature vector $V_3$ matches with the feature vector $V_9$. Therefore, the first vector set 702 and the second vector set 704 may be identified. Using the same method, the vector $V_4$ may match with the vector $V_{10}$, the vector $V_5$ may match with the vector $V_{11}$, and the vector $V_6$ may match with the vector $V_{12}$. In this case, the first vector set 702 may be expanded to include five vectors $V_2, V_3, V_4, V_5$, and $V_6$ and the second vector set 704 may be expanded to include five vectors $V_8, V_9, V_{10}, V_{11}$, and $V_{12}$.

Figure 8:
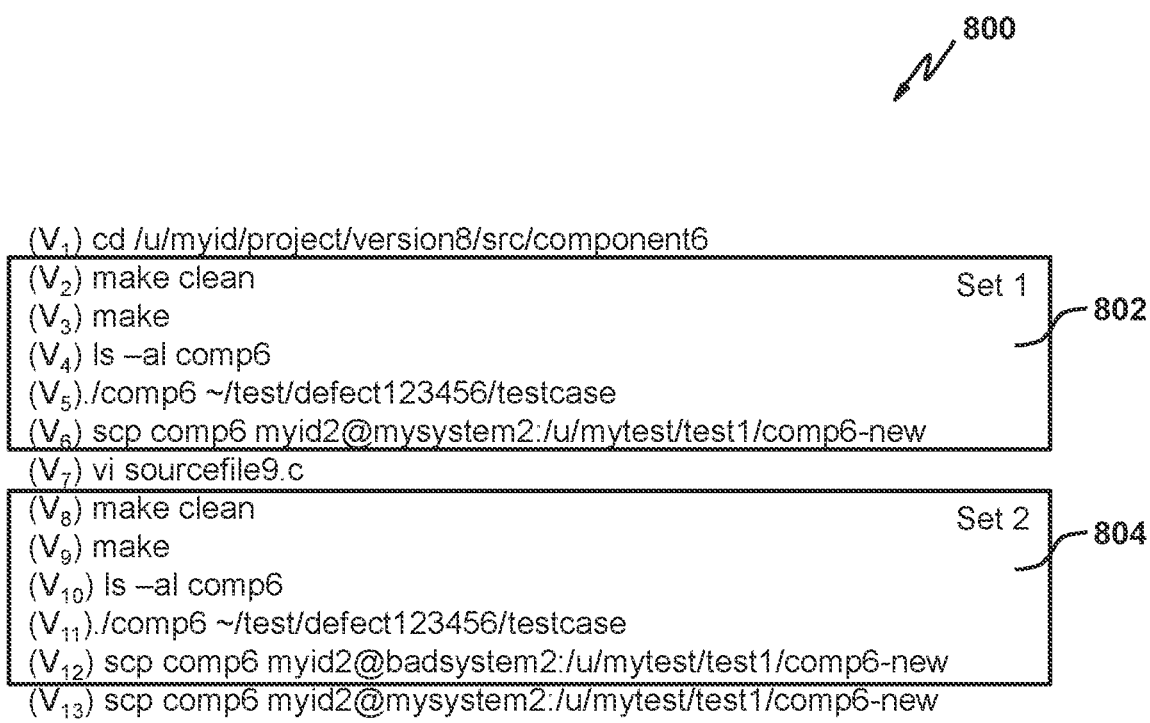
FIG. 8 depicts an example command line history including two expanded command sets in accordance with some embodiments of the present disclosure.

FIG. 8 depicts an example command history 800 including a first vector set 802 and a second vector set 804, where the first vector set 802 includes the five vectors $V_2, V_3, V_4, V_5$, and $V_6$ and the second vector set 804 include the five vectors $V_8, V_9, V_{10}, V_{11}$, and $V_{12}$.

As described above, the threshold Th2 may be trained to tolerate minor differences. For example, the vector $V_6$ includes a string "mysystem2", while the vector $V_{12}$ includes a string "badsystem2". Therefore, the vector $V_6$ is not exactly the same as the vector $V_{12}$, but the vector $V_6$ matches with the vector $V_{12}$.

Figure 9:
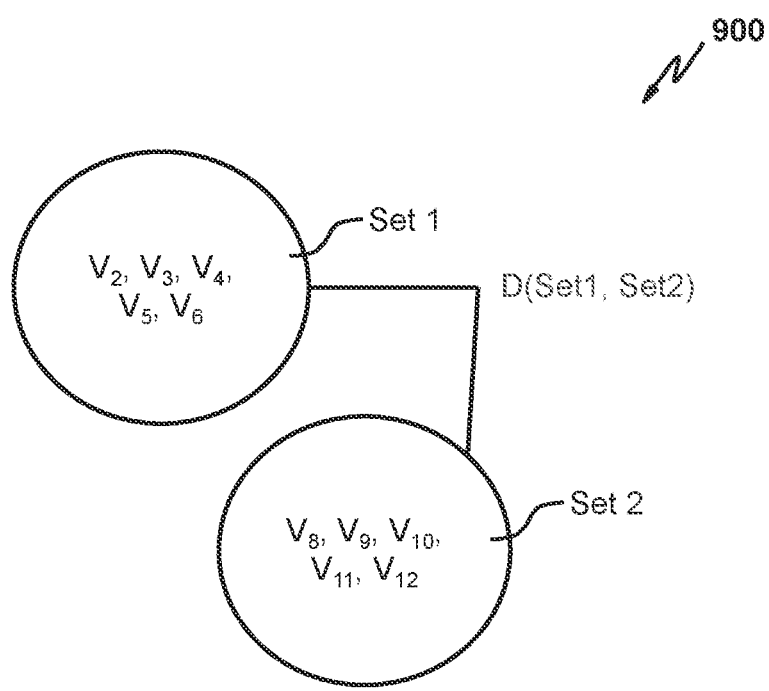
FIG. 9 depicts a method for determining the distance between two vector sets in accordance with some embodiments of the present disclosure.

FIG. 9 is a schematic diagram 900 depicting the distance between the first vector set ("Set 1") and the second vector set ("Set 2"). As shown in FIG. 9, the first vector set includes vectors $V_2, V_3, V_4, V_5$, and $V_6$, and the second vector set includes vectors $V_8, V_9, V_{10}, V_{11}$, and $V_{12}$. The distance between the first vector set and the second vector set may be denoted as D(Set1, Set2). The distance between the first vector set and the second vector set may be determined by summing the distance between each vector in the first vector set and a corresponding vector in the second vector set. For example, $D(Set1, Set2)=D_2(V_2, V_8)+D_2(V_3, V_9)+D_2(V_4, V_{10})+D_2(V_5, V_{11})+D_2(V_6, V_{12})$.

If the distance D(Set1, Set2) is less than a threshold $Th_4$, it is necessary to create a script based on the first and second vector sets. For example, when the first pair of vector sets are determined, the distance between the first pair of sets may be determined as the initial value for the threshold Th4. In other words, $Th4_{init}$=D(Set1, Set2). For example, if the vector sets Set1 and Set2 are exactly the same, Th4 will be set to 0.

Figure 10:
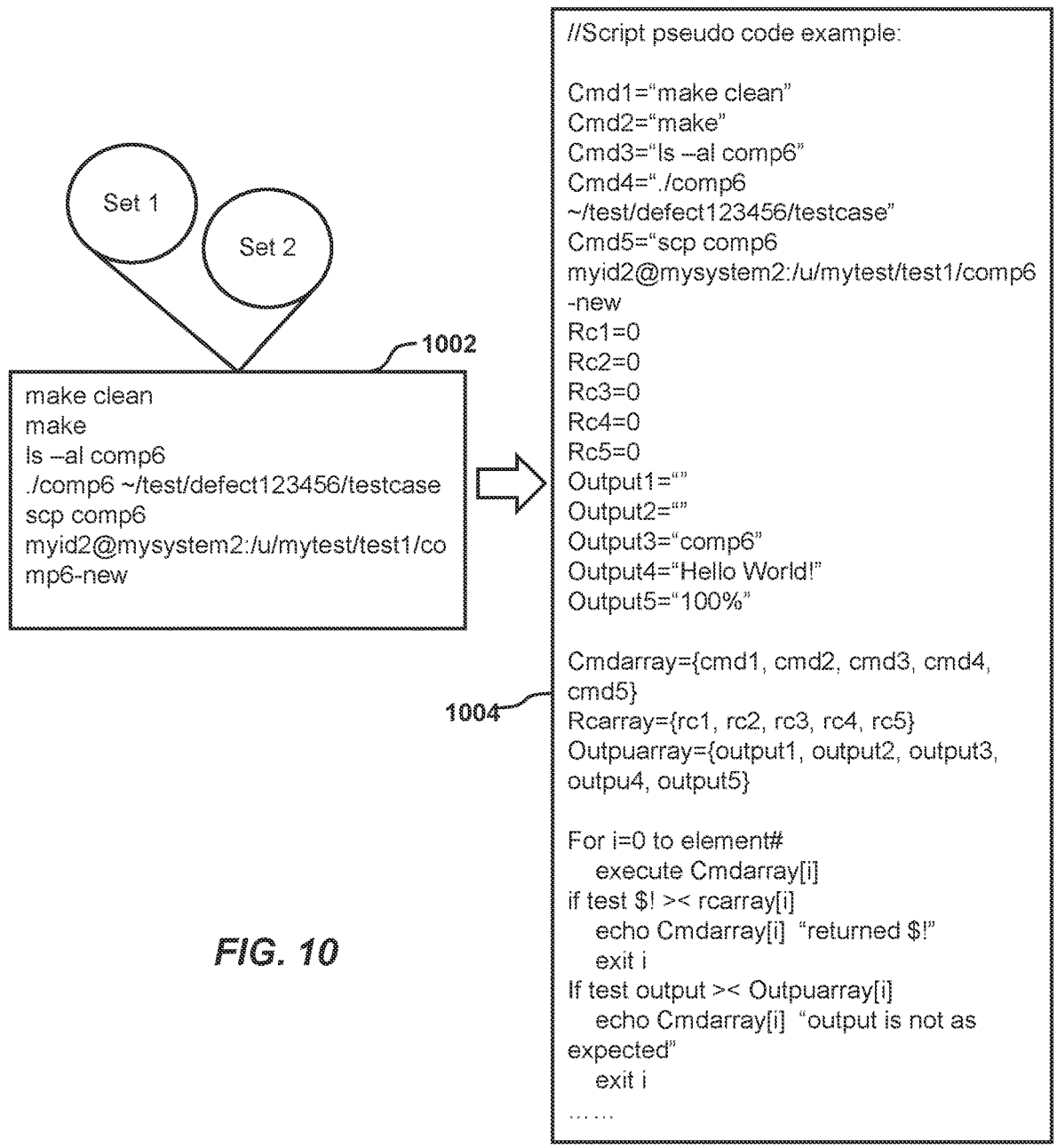
FIG. 10 depicts a method for creating a script in accordance with some embodiments of the present disclosure.

FIG. 10 depicts a method of creating a script based on the first vector set and the second vector set. In this example, the first vector set is the same as the second vector set, as shown in the block 1002. It is to be understood that various methods may be used to create the script based on the vector sets. For example, a method for creating the script is to save the command history in the vector set as the script. In other words, the created script may be the same as the commands in the block 1002.

In another example, as shown in FIG. 10, when creating the script 1004, an array may be created for each element. In FIG. 10, a Cmdarray, a Rcarray, and an Outputarray are created for each element. The command array Cmdarray may be traversed to execute the commands in the command array. Then, the return codes and the outputs may be detected to compare with the return codes in the Rcarray and the outputs in the Outputarray. If the return codes and the outputs are not the same as the corresponding return codes in the Rcarray and the outputs in the Outputarray, an error may be output and displayed on the terminal, for example, "output is not as expected".

Figure 11:
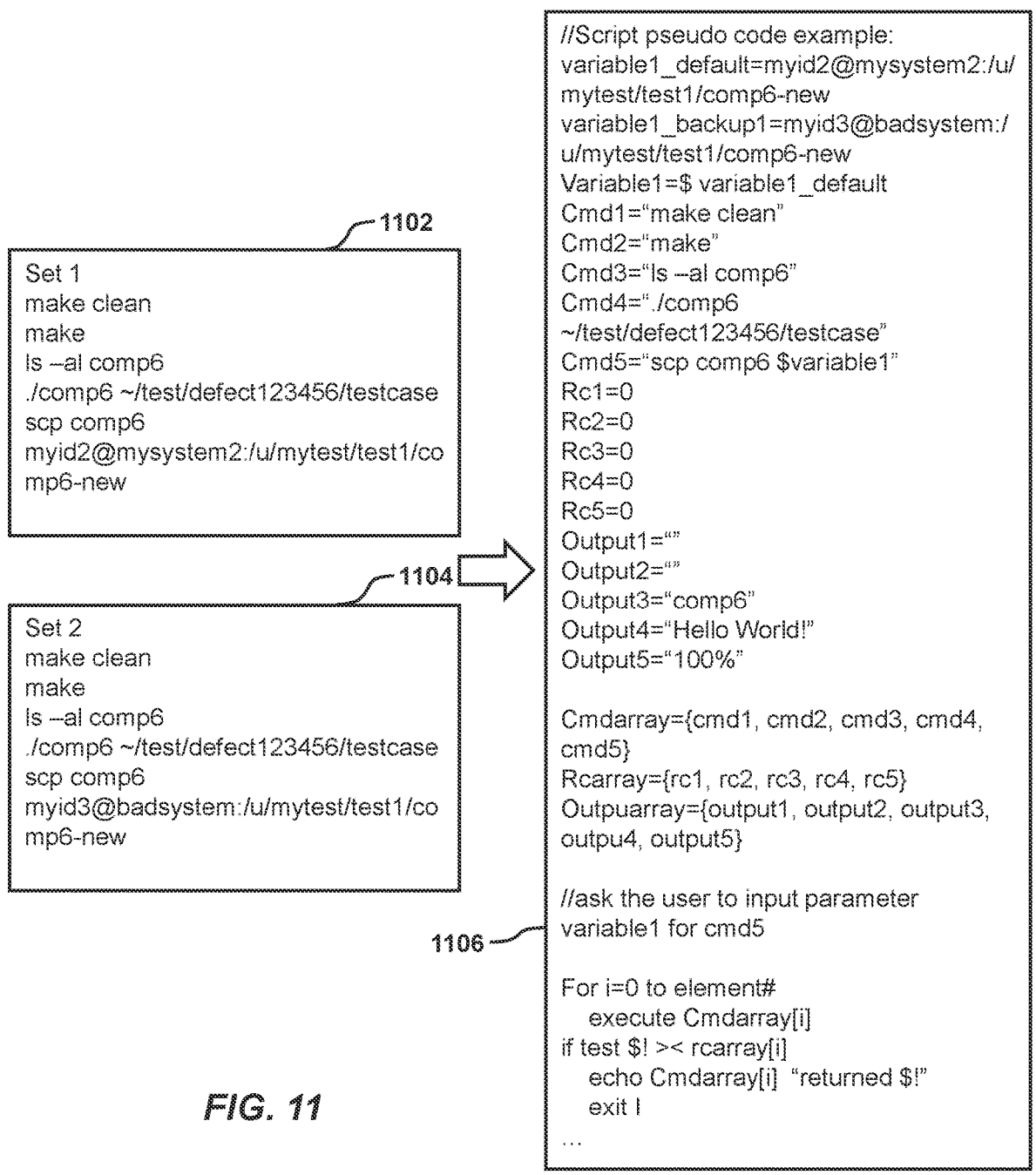
FIG. 11 depicts another method for creating a script in accordance with some embodiments of the present disclosure.

FIG. 11 depicts another method of creating a script based on the first vector set and the second vector set. In this example, the first vector set 1102 is not exactly the same as the second vector set 1104. For example, the first vector set 1102 includes a command "myid2@mysystem2:/u/mytest/test1/comp6-new", while the second vector set 1104 includes a command "myid3@badsystem:/u/mytest/test1/comp6-new". In this case, the script may be created to include a variable or parameter for the user to select or input. For example, the script 1106 includes a parameter "variable1" and the script 1106 may ask the user to input the value of the parameter "variable1" for cmd5, i.e., "scp comp6 $variable1".

Figure 12:
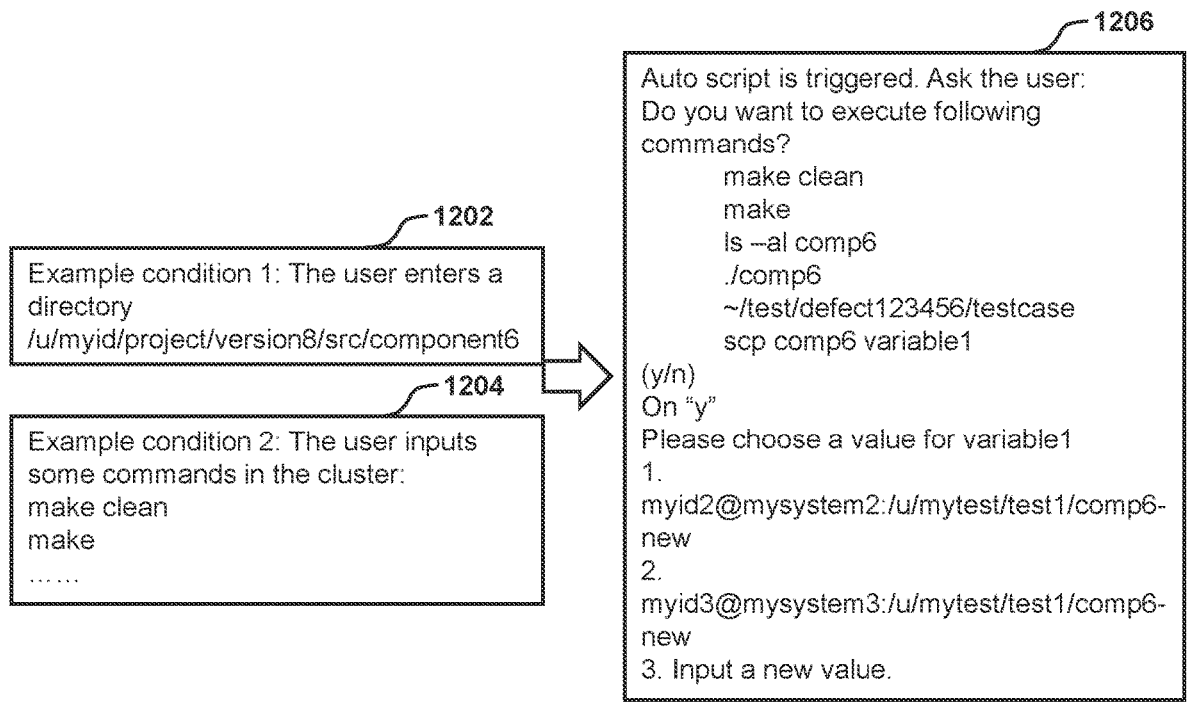
FIG. 12 depicts a method for providing a recommendation in accordance with some embodiments of the present disclosure.

FIG. 12 depicts an example for automatically triggering the script. If it is determined that a condition associated with a script is satisfied, the script may be automatically recommended to the user. Blocks 1202 and 1204 show different conditions for triggering the script. In the block 1202, the trigger condition is a directory. For example, if the user enters a directory associated with a vector set or script, a recommendation for the corresponding script may be automatically provided to the user. In the block 1204, the trigger condition may be a set of commands matching a vector set, where the matching method may be the ones as described above. For example, if the user inputs two or more commands that match a vector set, a recommendation for the script corresponding to the vector set may be provided to the user.

Block 1206 shows a message that may be displayed an on the terminal when a trigger condition is satisfied. In this case, the script includes a parameter "variable1" and the message provides three options for the user to select.

In some embodiments, if there are multiple matched scripts, one or more of the matched scripts may be recommended. For example, all of the matched scripts may be recommended for the user to select.

After the first pair of vector sets has been determined, more vector sets may be determined to expand the vector sets. In an embodiment, the same process for determining the first pair of vector sets may be repeated to create new pairs of vector sets. In another embodiment, the existing vector set may be used to determine a new vector set that matches the existing vector set. For example, if it is determined that a new vector set is similar to the determined pair of vector sets, the new vector set may be added to the determined pair of vector sets. In this way, more and more vector sets can be determined.

In some embodiments, a number of command sets or vector sets have been identified and a script may be created for more than two vector sets instead of a pair of vector sets. The vector sets may be classified into clusters and a script may be created for each cluster of vector sets. In this way, the number of the scripts may be reduced.

When a new vector set is identified, a determination may be made whether to create a new script for the new vector set. For example, the vector sets may include:

Set 1: {ls . . . , touch . . . , cat . . . }
Set 2: {ls . . . , touch . . . , cat . . . }
Set 3: {make . . . , is scp . . . }
Set 4: {make . . . , is scp . . . }
Set 5: {ls . . . , touch . . . , cat . . . }
Set 6: {make . . . , ls scp . . . }
Set 7: {cmd1 . . . , cmd2 . . . , cmdn . . . }
Set 8: {cmd1 . . . , cmd2 . . . , cmdn . . . }

It can be determined from the name element that Set 3 and Set 4 are different from Set 1 and Set 2. Therefore, a separate script may be created for Set 3 and Set 4. Similarly, a separate script may be created for Set 7 and Set 8. However, Set 5 has the same command names as Set 1 and Set 2 and it may be determined whether to create a separate script for Set 5. In some embodiments, a clustering method may be used to determine whether to create a separate script for Set 5. For example, a Density-Based Spatial Clustering of Applications with Noise (DBSCAN) algorithm may be used for the clustering.

In the DBSCAN method, each set may be transferred to a data point in 2n division space, because each of the n vectors may provide 2 elements—option and object. Therefore, the vector set may be expressed as elements. For example, Set.data=$\{w*V_1.\text{option}, (1-w)*V_1.\text{object}, w*V_2.\text{option}, (1-w)*V_2.\text{object}, \ldots w*V_n.\text{option}, (1-w)*V_n.\text{object}\}=\{e_1, e_2, e_3, \ldots e_{2n}\}$.

When the algorithm gives the result of adding or not adding a new set to a script, human intervention could be imported here to make the final decision, to let the users always get the script they really need. If the final decision is to add a new set to a script, the Th4 of this script will be updated to the maximum distance among the command sets related to this script.

DBSCAN groups together points that are close to each other based on a distance measurement and a minimum number of points minPoints, which is the minimum number of points that may form a dense region. DBSCAN may start with a radius r and the minimum number of points minPoints, which may be set to: $r=Th4_{max}$ and minPoints=2, where $Th4_{max}$ is the maximum Th4 in the same division space.

FIG. 13 shows an example of the clustering method. As shown in diagram 1302, each of the data points (i.e., vector sets) is taken as a center and the other data points within the radius r may be identified. If the number of the data points within the radius r is not less than minPoints, the data point will be marked as a central point; otherwise, the data point is marked as a noise point. This step is repeated for all the data points. If a noise point is located within a certain central point's radius, it's marked as a fringe point.

As shown in FIG. 13, data points 1 and 2 are in each other's circle. Data points 3, 4, and 6 are in each other's circle. Point 5 is not in any other's circle. At last, all central points and fringe points which are in each other's circle will be classified into one cluster. Otherwise, the point is a noise point, such as point 5.

As shown in FIG. 13, if Set 3, Set 4 and Set 6 are classified into one cluster 1304, Set 6 may be added to the script created from Set 3 and Set 4. After comparing Set 6 with the data in the script created from Set 3 and Set 4, if there are different values, the script may be updated to include more variables or variable values for the user to choose. If all the values in Set 6 are the same as those in the script, the script will not be updated. On the other hand, in the previous example, if Set 5 is not classified into any existing set, Set 5 may be left alone and matched with a subsequently identified vector set.

Figure 14:
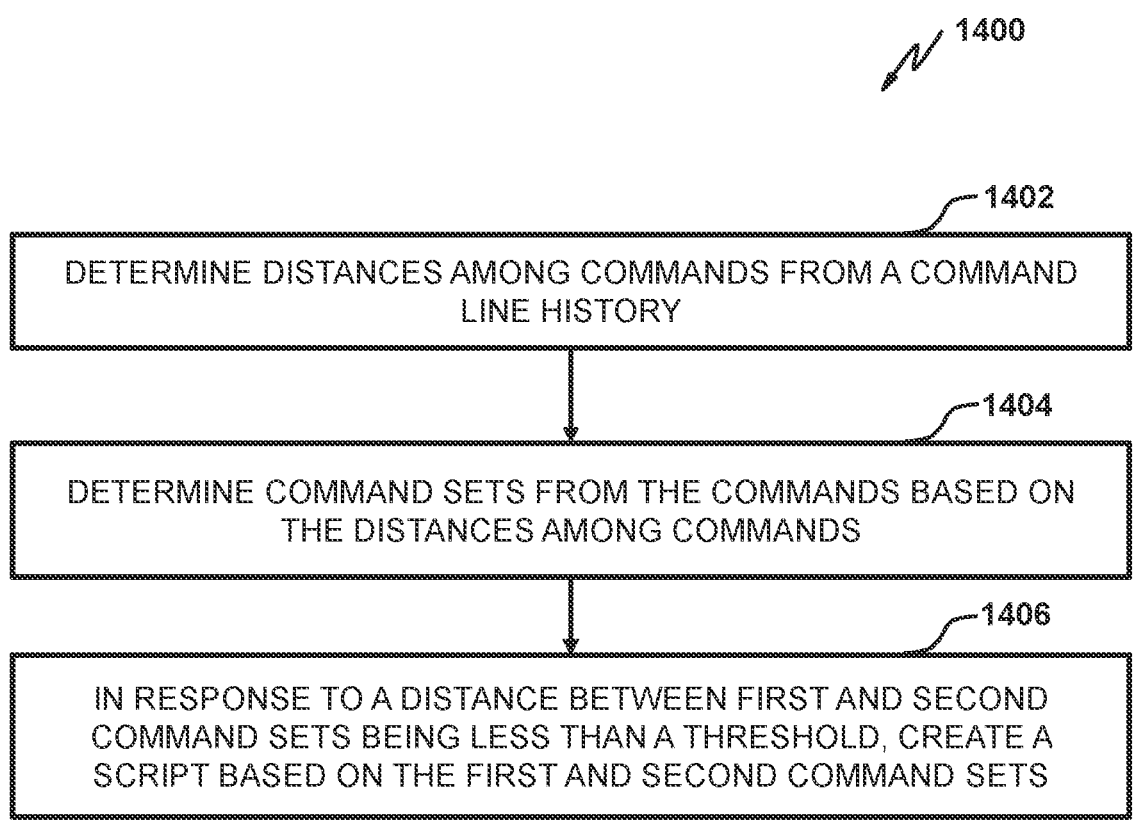
FIG. 14 depicts a method for creating a script from a command line history in accordance with some embodiments of the present disclosure.

FIG. 14 depicts a flowchart illustrating an example method 1400 for creating a script from a command line history in accordance with some embodiments of the present disclosure.

At block 1402, the method 1400 may determine a plurality of distances among a plurality of commands from a command line history.

At block 1404, the method 1400 may determine a plurality of command sets from the plurality of commands based on the plurality of distances among the plurality of commands. Each of the plurality of command sets may comprise at least two neighboring commands.

At block 1406, in response to a distance between a first and a second command sets of the plurality of command sets being less than a predetermined threshold (for example, the threshold Th4), the method 1400 may create a script based on the first and second command sets.

In some embodiments, determining the plurality of distances among the plurality of commands may comprise: converting each of the plurality of commands into a feature vector; and assigning one or more weights to one or more elements of the feature vector.

In some embodiments, each of the plurality of commands may comprise a first feature representing a name of the command, a second feature representing an option of the command, and a third feature representing an object of the command Determining the plurality of distances among the plurality of commands may comprise: determining the distance between a first command of the plurality of commands and a second command of the plurality of commands based on the first, second, and third features of the first command and the first, second, and third features of the second command.

In some embodiments, determining the distance between the first command and the second command may comprise: determining a first part of the distance between the first command and the second command by determining a distance between the first feature of the first command and the first feature of the second command; determining a second part of the distance between the first command and the second command by determining a weighted average of a distance between the second feature of the first command and the second feature of the second command and a distance between the third feature of the first command and the third feature of the second command; and determining a third part of the distance between the first command and the second command by determining a sum of a distance between the first feature of one of the plurality of commands before the first command and the first feature of one of the plurality of commands before the second command and a distance between the first feature of one of the plurality of commands after the first command and the first feature of one of the plurality of commands after the second command In some embodiments, determining the plurality of command sets may comprise: in response to determining that each of the first to third parts of the distance between a first command of the plurality of commands and a second command of the plurality of commands is less than a respective threshold, determining a first and a second command sets based on the first and second commands, respectively.

In some embodiments, determining the first and second command sets may comprise: determining the distance between one of the plurality of commands before or after the first command and a corresponding one of the plurality of commands before or after the second command; and in response to determining that each of the first to third parts of the distance between the one of the plurality of commands before or after the first command and the corresponding one of the plurality of commands before or after the second command is less than the respective threshold, adding the one of the plurality of commands before or after the first command and the corresponding one of the plurality of commands before or after the second command into the first and second command sets, respectively.

In some embodiments, the method 1400 may further comprise determining the distance between the first command set and the second command set based on the second part of the distance between each command in the first command set and a corresponding command in the second command.

In some embodiments, each of the plurality of commands may comprise a first feature representing a name of the command, a second feature representing an option of the command, a third feature representing an object of the command, a fourth feature representing a return code of the command, and a fifth feature representing an output of the command Creating the script may comprise creating the script based on the first to fifth features of the first and second command sets.

In some embodiments, the method 1400 may further comprise determining one or more commands currently entered by a user; and in response to determining whether a distance between the one or more commands currently entered by the user and one of the plurality of command sets is less than a predetermined threshold, providing a recommendation for the command set to the user.

In some embodiments, the method 1400 may further comprise classifying the plurality of command sets into a plurality of clusters based on the distances among the plurality of command sets; and creating a script for each cluster of command sets.

It should be noted that the processing of creating scripts according to embodiments of this disclosure could be implemented by computer system/server 12 of FIG. 1.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer programs products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the present disclosure. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
    determining, by one or more processors, a plurality of distances among a plurality of commands from a command line history;
    determining, by the one or more processors, a plurality of command sets from the plurality of commands based on the plurality of distances among the plurality of commands, wherein each of the plurality of command sets includes at least two neighboring commands, wherein the determining the plurality of distances among the plurality of commands comprises:
        converting, by the one or more processors, each of the plurality of commands into a feature vector, and
        assigning, by the one or more processors, one or more weights to one or more elements of the feature vector;
    creating, by the one or more processors, a script based on a first command set and a second command set of the plurality of command sets in response to a distance between the first command set and the second command set being less than a predetermined threshold; and automatically triggering the script when a condition associated with the script is satisfied, wherein the condition is a user entering a directory associated with a vector set or script, or a set of commands matching a vector set.

2. The method of claim 1, wherein each of the plurality of commands comprises a first feature representing a name of the command, a second feature representing an option of the command, and a third feature representing an object of the command, and wherein the determining the plurality of distances among the plurality of commands comprises:

determining, by the one or more processors, the distance between a first command of the plurality of commands and a second command of the plurality of commands based on the first, second, and third features of the first command and the first, second, and third features of the second command.

3. The method of claim 2, wherein the determining the distance between the first command and the second command comprises:

determining, by the one or more processors, a first part of the distance between the first command and the second command by determining a distance between the first feature of the first command and the first feature of the second command;

determining, by the one or more processors, a second part of the distance between the first command and the second command by determining a weighted average of a distance between the second feature of the first command and the second feature of the second command and a distance between the third feature of the first command and the third feature of the second command; and determining, by the one or more processors, a third part of the distance between the first command and the second command by determining a sum of a distance between the first feature of one of the plurality of commands before the first command and the first feature of one of the plurality of commands before the second command and a distance between the first feature of one of the plurality of commands after the first command and the first feature of one of the plurality of commands after the second command.

4. The method of claim 3, wherein the determining the plurality of command sets comprises:

determining, by the one or more processors, the first command set and the second command set based on the first command and the second command, respectively, in response to the determining that each of the first to third parts of the distance between the first command and the second command is less than a respective predetermined threshold.

5. The method of claim 4, wherein the determining the first command set and the second command set comprises:

determining, by the one or more processors, the distance between one of the plurality of commands before or after the first command and a corresponding one of the plurality of commands before or after the second command; and in response to determining that each of the first to third parts of the distance between the one of the plurality of commands before or after the first command and the corresponding one of the plurality of commands before or after the second command is less than the respective threshold, adding, by the one or more processors, the one of the plurality of commands before or after the first command and the corresponding one of the plurality of commands before or after the second command into the first and second command sets, respectively.

6. The method of claim 3, wherein the determining, by the one or more processors, the distance between the first command set and the second command set is based on the second part of the distance between each command in the first command set and a corresponding command in the second command.

7. The method of claim 1, wherein each of the plurality of commands comprises a first feature representing a name of the command, a second feature representing an option of the command, a third feature representing an object of the command, a fourth feature representing a return code of the command, and a fifth feature representing an output of the command, and wherein the creating, by the one or more processors, the script is based on the first to fifth features of the first command set and the second command set.

8. The method of claim 1, further comprising:

determining, by the one or more processors, one or more commands entered by a user; and providing, by the one or more processors, a recommendation for the command set to the user in response to determining whether a distance between the one or more commands entered by the user and a command set of the plurality of command sets is less than a predetermined threshold.

9. The method of claim 1, further comprising:

classifying, by the one or more processors, the command sets into a plurality of clusters based on the distances among the command sets; and creating, by the one or more processors, a script for each cluster of the plurality of clusters.

10. A computer system comprising:

one or more computer processors, one or more computer-readable storage media, and program instructions stored on the one or more of the computer-readable storage media for execution by at least one of the one or more processors, the program instructions including a method comprising:

determining a plurality of distances among a plurality of commands from a command line history;

determining a plurality of command sets from the plurality of commands based on the plurality of distances among the plurality of commands, wherein each of the plurality of command sets includes at least two neighboring commands, wherein the determining the plurality of distances among the plurality of commands comprises:

converting each of the plurality of commands into a feature vector, and assigning one or more weights to one or more elements of the feature vector;

creating, by the one or more processors, a script based on a first command set and a second command set of the plurality of command sets in response to a distance between the first command set and the second command set being less than a predetermined threshold; and automatically triggering the script when a condition associated with the script is satisfied, wherein the condition is a user entering a directory associated with a vector set or script, or a set of commands matching a vector set.

11. The device of claim 10, wherein each of the plurality of commands comprises a first feature representing a name of the command, a second feature representing an option of the command, and a third feature representing an object of the command, and wherein the determining the plurality of distances among the plurality of commands comprises:

determining the distance between a first command of the plurality of commands and a second command of the plurality of commands based on the first, second, and third features of the first command and the first, second, and third features of the second command.

12. The device of claim 11, wherein the determining the distance between the first command and the second command comprises:

determining a first part of the distance between the first command and the second command by determining a distance between the first feature of the first command and the first feature of the second command;

determining a second part of the distance between the first command and the second command by determining a weighted average of a distance between the second feature of the first command and the second feature of the second command, and a distance between the third feature of the first command and the third feature of the second command; and determining a third part of the distance between the first command and the second command by determining a sum of a distance between the first feature of one of the plurality of commands before the first command and the first feature of one of the plurality of commands before the second command and a distance between the first feature of one of the plurality of commands after the first command and the first feature of one of the plurality of commands after the second command.

13. The device of claim 12, wherein the determining the plurality of command sets comprises:

determining a first command set of the plurality of command sets and a second command set of the plurality of command sets based on the respective first command and the second command in response to the determining that each of the first to third parts of the distance between the first command and the second command is less than a respective predetermined threshold.

14. The device of claim 13, wherein the determining the first command set and the second command set comprises:

determining the distance between one of the plurality of commands before or after the first command and a corresponding one of the plurality of commands before or after the second command; and adding the one of the plurality of commands before or after the first command and the corresponding one of the plurality of commands before or after the second command into the first command set and the second command set, respectively, in response to determining that each of the first to third parts of the distance between the one of the plurality of commands before or after the first command and the corresponding one of the plurality of commands before or after the second command is less than the respective predetermined threshold.

15. The device of claim 12, further comprising:

determining the distance between the first command set and the second command set based on the second part of the distance between each command in the first command set and a corresponding command in the second command set.

16. The device of claim 10, wherein each of the plurality of commands comprises a first feature representing a name of the command, a second feature representing an option of the command, a third feature representing an object of the command, a fourth feature representing a return code of the command, and a fifth feature representing an output of the command, and wherein creating the script is based on the first to fifth features of the first command set and the second command set.

17. The device of claim 10, further comprising:

determining one or more commands entered by a user; and providing a recommendation for the command set to the user in response to determining whether a distance between the one or more commands entered by the user and a command set of the plurality of command sets is less than a predetermined threshold.

18. A computer program product comprising:

one or more computer-readable storage media and program instructions stored on the one or more computer-readable storage media, the program instructions including a method, the method comprising:

determining a plurality of distances among a plurality of commands from a command line history;

determining a plurality of command sets from the plurality of commands based on the plurality of distances among the plurality of commands, each of the plurality of command sets includes at least two neighboring commands, wherein the determining the plurality of distances among the plurality of commands comprises:

converting each of the plurality of commands into a feature vector, and assigning one or more weights to one or more elements of the feature vector;

creating a script based on a first command set and a second command set of the plurality of command sets in response to a distance between the first command set and the second command set being less than a predetermined threshold; and automatically triggering the script when a condition associated with the script is satisfied, wherein the condition is a user entering a directory associated with a vector set or script, or a set of commands matching a vector set.

* * * * *